United States Patent [19]
Reister

[11] 3,896,364
[45] July 22, 1975

[54] ELECTRIC RAZOR ADAPTER

[76] Inventor: Richard A. Reister, Box 110, O. W. S. Rd., Yucca Valley, Calif. 92284

[22] Filed: Oct. 18, 1974

[21] Appl. No.: 516,612

Related U.S. Application Data

[63] Continuation-in-part of Ser. No. 388,572, Aug. 15, 1973, abandoned.

[52] U.S. Cl. .......... 320/2; 320/51; 320/56; 30/DIG. 1
[51] Int. Cl. .............................. H02j 7/00
[58] Field of Search .......... 320/2, 51, 56; 307/10 R, 307/48, 151, 65; 30/DIG. 1; 318/139, 514

[56] References Cited
UNITED STATES PATENTS

| | | | |
|---|---|---|---|
| 3,089,071 | 5/1963 | Hartwig | 320/2 |
| 3,416,059 | 12/1968 | Lagier | 318/514 X |
| 3,757,186 | 9/1973 | Ozawa | 318/514 |

*Primary Examiner*—J. D. Miller
*Assistant Examiner*—Robert J. Hickey

[57] ABSTRACT

The present invention relates to an adapter enabling electric razors to be utilized in automobiles, travel trailers, motor homes, or boats, and particularly concerns a device for conveniently adapting a 4 volt self-contained battery operated electric razor to the 12 volt system provided in automotive vehicles, marine craft, or other transportation vehicles.

30 Claims, 7 Drawing Figures

ELECTRIC RAZOR ADAPTER

The present application is a continuation-in-part of application Ser. No. 388,572, filed Aug. 15, 1973, in which 27 claims were allowed, application Ser. No. 388,572 being abandoned in favor of the present application to include some minor modifications which may be provided in the invention.

The typical electric razor with a 3 or 4 volt self-contained battery for cordless operation has a 110 Volt household adapter, consisting of a small transformer and diode or rectifier, which may be plugged into a conventional 110 volt A. C. household outlet to produce a 4 volt D. C. output for operating the electric razor or recharging the self-contained batteries in the razor.

On automobile trips, camping excursions in a travel trailer or motor home, or cruises in marine craft, it would be convenient to have a small adapter which could be plugged into the 12 volt system of the mentioned vehicles for operation of the electric razor when the self-contained batteries were run down, or to conserve and recharge the self-contained batteries in the electric razor.

It is accordingly one of the objects of the present invention to provide a simple adapter to convert 12 volts D. C. to approximately 3 or 4 volts D. C. suitable for operation of the mentioned electric razors.

Another object of the present invention is to provide convenient starting means on such an adapter to overcome the initial heavier starting current of the electric razor.

A further object is to provide for proper recharging of the self-contained battery of the electric razor in such an adapter.

Another object is to provide for adequate heat dissipation in such an adapter.

A further object is to provide such an adapter as simply and economically as possible.

Another object is to provide such an adapter compact in size and attractive in appearance.

A further object is to provide such an adapter which is reliable and safe in use in preventing damage to the electric razor or self-contained battery through inadvertent voltage surges.

Other desirable features and advantages of the invention will appear more fully hereinafter from the following detailed description when taken in connection with the accompanying drawings illustrating one form of the invention. It is to be expressly understood, however, that the drawings are utilized for purposes of illustration only and are not to be taken as a definition of the limits of the invention, reference being had for this purpose to the specification and appended claims.

In the drawings, wherein similar reference characters refer to like parts throughout the several views.

While the description herein considers the instant invention as applied to the problem of electric razor adaption, it is to be understood that the present invention also relates to the novel features or principle of the instrumentalities described herein, whether or not such are used for the stated objects, or in the stated fields or combinations.

Figure 1:
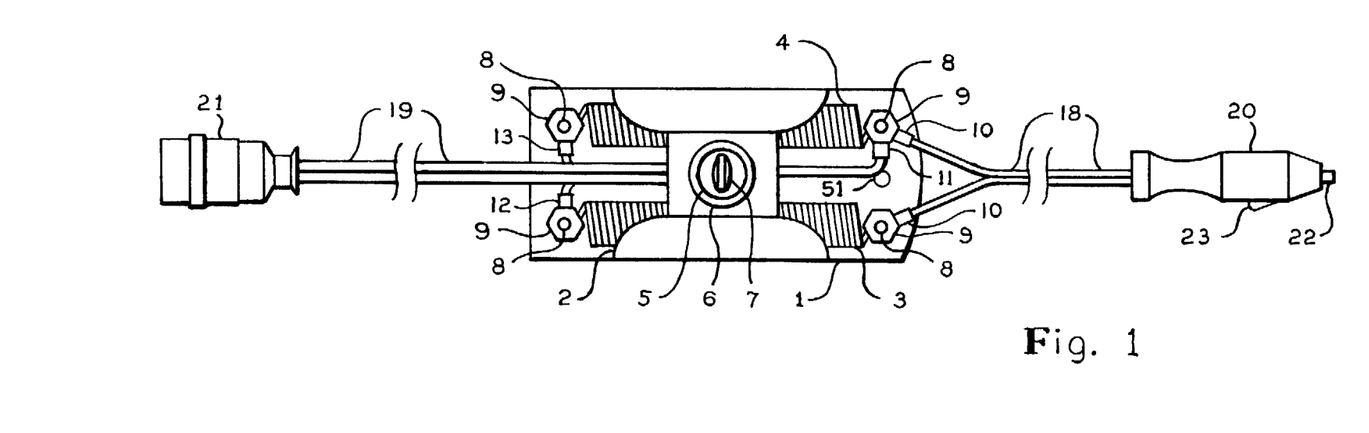
FIG. 1 is a top view of the components of the electric razor adapter.
Figures 3, 4, 5, 6, 7:
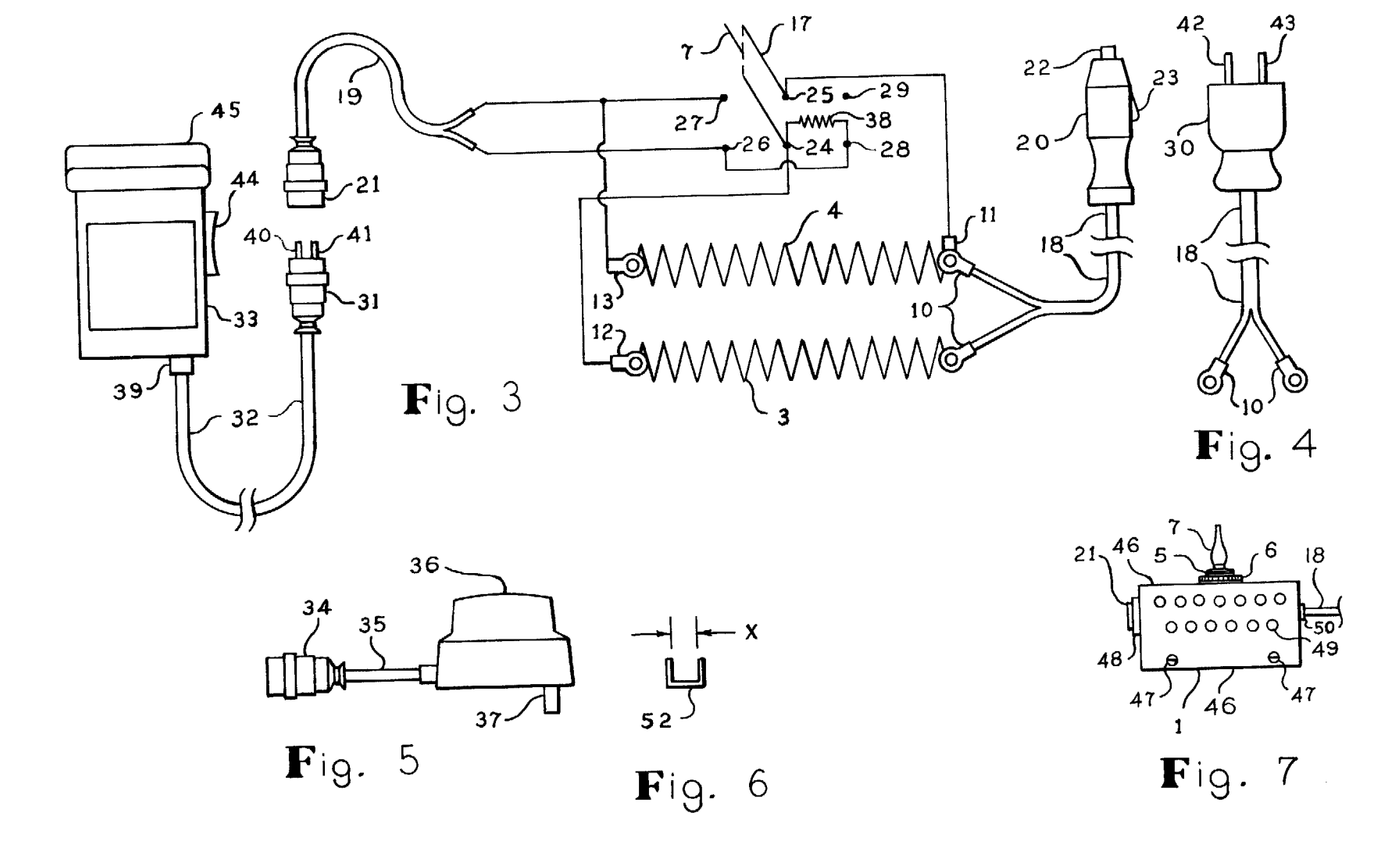
FIG. 3 is a schematic view illustrating the electrical connections of the primary component of the electric razor adapter.
FIG. 4 illustrates another form of plug-in connector for the input of the 12 volt D. C. razor adapter.
FIG. 5 illustrates the normal 110 volt A. C. household adapter supplied with the electric razor, modified for interchangeable use of the electric razor with either the 110 volt A. C. or 12 volt D. C. razor adapter.
FIG. 6 illustrates an insertable clip for appropriate adjustment of the resistance means in the 12 volt D. C. razor adapter to compensate for various razor models, if necessary.
FIG. 7 illustrates a fully enclosed form of the 12 volt D. C. razor adapter.

The primary elements of the system to be described herein include a resistor element of appropriate resistance and wattage to reduce the 12 volt battery source of automotive and marine equipment to the 3 or 4 volt D. C. output necessary for operation of electric razors with self-contained batteries. Dual resistor elements 3 and 4 in FIGS. 1 and 3 are utilized for advantages in economy, compactness, and heat dissipation; a double-pole, double-throw, center position off switch 17 being utilized to control the voltage output of the resistor element for purposes of starting and running the electric razor or recharging the self-contained batteries in the electric razor. Switch 17 when thrown in one direction from center off position shunts resistors 4 and 38 to include only resistor 3 in series with the 12 volt battery source for starting the electric razor, switch 17 when thrown in the opposite direction from center off position shunts resistor 38 to include resistors 3 and 4 in series with the 12 volt battery source for normal running of the electric razor, and switch 17 when in center off position includes resistors 3, 4, and 38 in series with the 12 volt battery source for recharging the self-contained batteries in the electric razor.

A truncated V or pyramid saddle mount 2 is utilized to mount switch 17 on resistor base 1, the described saddle mount 2 providing protection from physical contact with the resistor element, and providing maximum heat dissipation from the resistor element. The input of the resistor element is appropriately connected to an adapter 20 or 30 which may be plugged into conventional 12 volt cigarette lighter receptacles or other voltage outlets of automotive and marine equipment. The output of the resistor element is appropriately connected to a two wire line plug-in connector 21, as illustrated in FIGS. 1 and 3, into which the cord of the electric razor may be connected by means of a similar plug-in connector 31.

The schematic wiring and principle of operation is clearly illustrated in FIG. 3, where it is seen that the 3 or 4 volt D. C. output 110 volt A. C. household adapter 36 of FIG. 5 (normally supplied and used with the electric razor) is provided with a two wire line plug-in connector 34 identical to plug-in connector 21, such that the mating plug-in connector 31, electrically connected to cord 32 of razor 33, may be plugged into either connector 21 of the automotive and marine adapter or connector 34 of the household adapter. The other end of cord 32 is electrically connected to two wire line plug-in connector 39 which plugs into two pins in the base of razor 33. Plug-in connectors such as connectors 21, 31, 34, and 39 normally have means to maintain proper polarity, one connector pin usually being slightly larger in diameter than the other to assure proper insertion and polarity.

The electric razor illustrated in FIG. 3 happens to be a Remington Rand Model 29 with self-contained batteries. This particular model has a double-throw, center position off rotary switch in the base operating appropriate electrical contacts such that when the razor switch is in center off position, the pins of connector 39 are electrically connected to the self-contained battery of razor 33 for recharging of the batteries from line cord 32, the electric motor of razor 33 being electrically disconnected from both the self-contained battery and line cord 32 when the razor switch is in center off position. Rotating the razor switch clockwise from the center off position electrically connects the self-contained battery to operate the electric motor in the razor, even though cord 32 and connector 39 may be disconnected from razor 33. Rotating the razor switch counter-clockwise from the center off position electrically disconnects the self-contained battery both from the electric motor and line cord 32, and electrically connects the razor motor to the pins of connector 39 for operation of the electric motor from only line cord 32.

Figure 2:
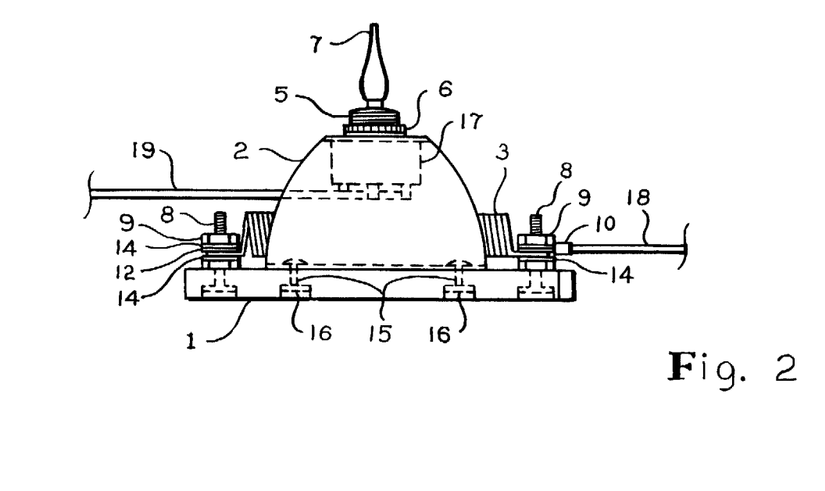
FIG. 2 is a side view of the primary component of the electric razor adapter.

When operated from the normal 110 volt household adapter 36 of FIG. 5 and tested with a voltmeter and ammeter, the operating voltage of the Remington Rand was 2.5 volts D. C., and the current was 2 amperes. The combined resistance of resistors 3 and 4 for operation from a 12 volt battery source would therefore be approximately 5 ohms and 20 watts, or each resistor 3 and 4 would be approximately 2½ ohms and 10 watts. (Assuming actual battery voltage = 12.5 volts, voltage drop in resistance = IR, and wattage dissipated by resistors = I²R). Resistors 3 and 4 could have been combined into a single resistance, however the resistance coil diameter would then have to be larger for the same length resistance, requiring some kind of core for the resistance to be wrapped upon for support to prevent contact of adjacent coils, which would increase the cost and decrease the heat dissipation of the resistance. It is believed the dual resistance would also provide a more compact and neater adapter. The coil diameter of resistors 3 and 4 in FIGS. 1, 2, and 3 is approximately ½ inch and the length approximately 3 inches, which readily permits support of the resistors between mounting bolts 8 on base 1 without any internal core, the resistors being stretched between mounting bolts 8 sufficiently so that the adjacent coils of the resistance material do not touch each other. The resistance coils are turned from conventional resistance wire, the coil diameter, length, and wire gauge being appropriate to provide the desired resistance and Wattage. Thus the dual resistor elements 3 and 4 provide a compact, economical resistance with maximum heat dissipation qualities, for air can readily circulate between the adjacent coils of the resistance element.

The starting current of the electric razor is higher than the running current, therefore when the rotary switch on the Remington Rand model is turned counter-clockwise to disconnect the self-contained battery (as previously described), and connector 31 of cord 32 is plugged into the automotive and marine adapter of FIG. 3 to operate razor 33, the initial voltage drop in resistors 3 and 4 is sometimes sufficient to prevent starting of the electric razor. Double-pole, double-throw, center position off switch 17 in FIGS. 1, 2, and 3 is utilized to overcome the starting difficulty. It was found through testing, that best starting results were obtained when switch 17 was used to shunt approximately half of the combined resistance of resistors 3 and 4, however the razor 33 could not be initially drawing normal starting current when switch 17 was utilized to short out half the combined resistance, thus making a variable resistance of the rheostat type undesirable. Therefore switch 17 was electrically connected as illustrated in FIG. 3 so that only the small charging current through resistor 38 flows through razor 33 when switch 17 is in center-off position. Upon throwing switch 17 to the starting position, the voltage output of the resistance element is electrically connected to razor 33 while resistor 4 and 38 are shunted, thus providing the necessary starting voltage to start razor 33, whereupon switch 17 is immediately thrown to the running position, where electrical connection is made to razor 33 with resistors 3 and 4 being included in series with the 12 volt automotive or marine battery source, resistor 38 being shunted.

Accordingly, in FIGS. 1 and 3, 12 volt cigarette lighter plug-in adapter 20 is electrically connected to the two front mounting bolts 8 of base 1, two wire cable 18 being soldered into soldering lugs 10 which are attached to bolts 8. Adapter 20 is a conventional cigarette lighter adapter for automobiles, which may be puchased in automobile applicance stores, front prong 22 and side spring clip 23 of adapter 20 providing electrical contact and being electrically connected to two wire cable 18, cable 18 being of sufficient length such that the resistor assembly mounted on base 1 may be conveniently placed on the automobile seat when adapter 20 is plugged into the cigarette lighter receptacle of the automobile.

Base 1 of the resistor assembly is made of bakelite, plastic, or some such similar insulating material. Bolts 8 are conventional 9–32 bolts, with round head, flat head, or hex head, preferably of brass, although not necessarily so, with the heads countersunk into base 1 so that the heads cannot make electrical contact if base 1 should be set on any metal surface. One nut 9 is placed below and one nut 9 is placed above the ends of coiled resistors 3 and 4, the ends of resistors 3 and 4 being formed into a loop of proper diameter to fit around bolts 8, such that the lower nut 9 securely fastens bolt 8 to base 1 and supports resistors 3 and 4 at a proper height above base 1. Soldering lugs 10 are placed in direct contact with the looped ends of resistors 3 and 4 on bolts 8, either on top of or below resistors 3 and 4, the top position as illustrated providing easier assembly. One washer 14 may be placed on bolt 8 below the looped end of resistors 3 and 4, and one washer 14 placed above the soldering lugs 10 as illustrated, washers 14 being preferably of brass or copper for better electrical contact, although not necessarily so, since the soldering lug 10 is in direct electrical contact with resistors 3 and 4 anyway, the top washer 14 providing for convenient tightening of top nut 9 without rotating the proper position of soldering lug 10. Other conventional fastening methods such as rivets might be utilized to mount the resistors 3 and 4 in a similar manner, although it is believed bolts 8 as illustrated would be preferred. Positive and negative polarity markings may be provided on base 1 respectively near the two soldering lugs 10 to maintain proper polarity of cable 18, cigarette lighter adapter 20 (as purchased) having such positive and negative polarity markings for cable 18.

The other ends of coiled resistances 3 and 4 are similarly attached to bolts 8 which are fastened to base 1 in a similar manner, coiled resistances 3 and 4 being stretched sufficiently so that adjacent coils of the resistance wire do not make electrical contact with each other. Soldering lug 12 in FIGS. 1 and 3 is fastened on bolt 8 to make electrical contact with the ends of resistance 3, similarly as soldering lug 10, soldering lug 12 being electrically connected by an appropriate wire to terminal 24 of double-pole, double-throw switch 17 as illustrated. Soldering lug 13 is similarly fastened on bolt 8 to make electrical contact with the end of resistance 4, soldering lug 13 being electrically connected by an appropriate wire to terminal 27 of switch 17 as illustrated. Soldering lug 11 is similarly fastened on bolt 8 to make electrical contact with soldering lug 10 and the end of resistance 4, soldering lug 11 being electrically connected by an appropriate wire to terminal 25 of switch 17 as illustrated. One wire of two wire cable 19 is electrically connected to terminals 26 and 28 of switch 17, and the other wire of two wire cable 19 is electrically connected to terminal 27 of switch 17 as illustrated, two wire plug-in connector 21 being electrically connected to the other end of cable 19 as illustrated. Cable 19 may be of any convenient length, approximately 8 inches being suitable. Mating plug-in connector 31, electrically connected to two wire cable 32 of razor 33 then plugs into connector 21 as indicated.

Resistor 38 is electrically connected from terminal 24 to terminal 28 of switch 17 as illustrated to provide for recharging of the self-contained battery in razor 33 from the 12 volt battery source of the automotive and marine adapter when switch 17 is in center off position, resistors 3, 4, and 38 then being electrically connected in series between razor 33 and the 12 volt battery source. When razor 33 is plugged into 110 volt household adapter 36, the charging current to recharge the self-contained battery in razor 33 varies from approximately 0.08 amperes when the battery is discharged, to approximately 0.04 amperes when the battery approaches full charge, the output voltage of adapter 36 being approximately 3.5 volts D. C. while recharging the self-contained battery. Therefore resistor 38 may be approximately 150 to 200 ohms with a ½ to 1 Watt capacity, to provide approximately 0.03 to 0.05 amperes charging current when razor 33 is plugged into the automotive and marine adapter, for the charging current of the automotive and marine adapter remains practically constant as the self-contained battery in razor 33 is being recharged, due to the decreasing voltage drop in resistor 38 with decreasing charging current. The rotary switch in the base of razor 33 is of course turned to off position for recharging the self-contained battery, as previously described.

When switch 17 is placed in starting position, terminal 28 is electrically connected to terminal 27 by the contacts of switch 17 to shunt resistor 4, and terminal 24 is electrically connected to terminal 26 by the contacts of switch 17 to shunt resistor 38 and close the electrical circuit to cable 19 so that only resistor 3 is included in series between razor 33 and the 12 volt automotive or marine battery source. Immediately upon starting of razor 33, switch 17 is thrown to running position, whereupon terminal 25 is electrically connected to terminal 29 by the contacts of switch 17 to disconnect the shunting of resistor 4, and terminal 24 is electrically connected to terminal 28 by the contacts of switch 17 to shunt resistor 38 and close the electrical circuit to cable 19 so that both resistors 3 and 4 are included in series between razor 33 and the 12 volt automotive or marine battery source.

The Sunbeam electric razor with self-contained batteries, and also other razor models, have only a two position or single-throw razor switch, such that when the razor switch is in the off position, the self-contained batteries are recharged when the line cord of the razor is plugged into the 110 volt household adapter or the automotive and marine adapter. When the razor switch is turned on, the electric motor of the razor is of course operated by the self-contained batteries when the line cord of the razor is not plugged in, or by the line cord when using the household, automotive, or marine adapter. Thus the Sunbeam and similar electric razor models with a two position switch do not need the starting position of switch 17 in FIG. 3, provided the self-contained batteries of the razor are sufficiently charged to start the razor motor. If the self-contained batteries in the Sunbeam electric razor or other models with a two position switch should become dead so that they cannot be recharged, the razor cannot be operated even from the line cord due to the current consumed by the dead battery, although it is a simple matter to disconnect one of the wires from the self-contained dead battery, after which the razor can be operated from the line cord when using the household, automotive, or marine adapter. The Remington Rand model of course can be operated from the line cord when the self-contained battery is dead, merely by rotating the razor switch counter-clockwise, which disconnects the self-contained battery as previously described.

The Sunbeam electric razor has a slightly heavier starting current than the Remington Rand, therefore when a dead self-contained battery in the Sunbeam razor is disconnected to make operation possible from the illustrated adapter of FIG. 3, the starting position of switch 17 is always necessarily used in order to start the Sunbeam razor. Terminals 25, 26, 27, and 29 of switch 17 could be eliminated, leaving a single-pole, single-throw switch with only terminals 24 and 28 electrically connected as illustrated, such that switch 17 would only have an on position for operating razor 33 and an off position for recharging the self-contained battery of razor 33 from the 12 volt automotive or marine battery source, as previously described. However, the saving in economy of a single-pole, single-throw switch over a double-pole, double-throw switch would be negligible, and it is believed the switch 17 as illustrated would be preferred, to provide operation of an electric razor even though the self-contained battery in the razor was dead, as previously described.

The present state of art provides a variety of different types of switches which could be utilized to duplicate the function of switch 17, that is, a first position of such switching means electrically connecting a first resistance in series between a secondary battery source and the electric razor for starting of said electric razor, a second position of such switching means electrically connecting a second resistance in series between a secondary battery source and the electric razor for normal running of said electric razor, and a third position of such switching means electrically connecting a third resistance in series between a secondary battery source and the primary battery source within the electric razor to properly recharge the self-contained battery of the electric razor from the secondary battery source of a transportation vehicle. Obviously a single-pole, three position switch could be utilized to electrically connect the described first, second, and third resistance means in series between cable 18 and cable 19 in FIGS. 1, 2, and 3. Such switching means could also be of the rotary, slide, toggle, or push-button type, in addition to either being single-pole or double-pole to accomplish the same described functions. Such switches also are manufactured with a spring return from a first position, such that the switch will only remain in the first position while being manually operated, and upon manual release returns to a normal position such as the described third position. Thus a double-pole, double-throw, center position off toggle switch as illustrated could be utilized which has a spring return from a first or starting position to a third or charging position, similarly as previously described.

Saddle mount 2 provides for attaching switch 17 to base 1, saddle mount 2 being comprized of a truncated V or pyramid shaped piece of metal as illustrated in FIGS. 1 and 2, which is wider at the base in width and depth than at the top, with curved sides as illustrated. An angled lip or flange at the bottom of saddle mount 2 provides for attaching to base 1 by means of roundhead bolts 15 as illustrated in FIG. 2, base 1 being counter-sunk for nuts 16 as illustrated. Each side of saddle mount 2 is secured by two bolts 15 as illustrated. (Other conventional fastening means such as rivets might also be used to attach saddle mount 2 to base 1 in a similar manner.) Switch 17 is then mounted in the truncated apex of a saddle mount 2 as illustrated, a hole being provided in the top of saddle mount 2 to accommodate mounting shaft 5 of switch 17, knurled nut 6 being tightened on threads of shaft 5 to securely fasten switch 17 in place. Paddle 7 provides for operating switch 17, paddle 7 being in a center vertical position as illustrated when off, paddle 7 then being pushed in one direction along the longitudinal axis of base 1 for starting position, and paddle 7 being flipped in the opposite direction along the longitudinal axis of base 1 for running position.

Saddle mount 2 provides some coverage and protection for resistors 3 and 4, however still leaves them practically wide open for maximum heat dissipation, for an appreciable amount of heat is generated from the 10 watt resistors. Saddle mount 2 also provides a neat appearing mount for switch 17. Any suitable sheet metal, such as galvanized iron, aluminum, stainless steel, etc., may be utilized for forming saddle mount 2.

Resistors 3 and 4 mounted on base 1 can be enclosed in a rectangular box 46, as illustrated in FIG. 7, rectangular metal box 46 being open at the bottom to fit snugly over base 1, two screws 47 on each side securing box 46 to base 1. Screws 47 may be threaded directly into base 1 or into metal inserts imbedded and achored in base 1, base 1 having either a curved or straight front edge as indicated in FIGS. 1 and 3. Switch 17 is mounted in the top of box 46 by knurled nut 6 on threaded shaft 5 of switch 17, similarly as in saddle mount 2, paddle 7 operating switch 17 as previously described. An opening is provided in one end of box 46 for rubber grommet 50, through which cable 18 is passed to connect to plug-in adapter 20. An opening could be provided in the opposite end of box 46 for another grommet through which cable 19 could be passed (not illustrated) to connect to plug-in connector 21, or connector 21 can be attached directly in the end of box 46 as illustrated. The end of connector 21 may be threaded to take a nut 48 to fasten connector 21 similarly as switch 17, or a flange 48 on connector 21 may be utilized to bolt connector 21 in an opening in the end of box 46, flange 48 being bolted either inside or outside of box 46. The pin connections of connector 21 would be identical to those of connector 34, as previously indicated, so that connector 31 of razor 33 can be plugged into either connector 34 of household adapter 36, or connector 21 of box 46.

Two rows of holes 49 on each side of box 46 as illustrated provide for convection of heat from the enclosed resistors 3 and 4. Any number of rows of such openings could be provided, however it is believed that two rows of such holes approximately one-fourth inch in diameter as illustrated would be preferred and adequate. A channel may also be provided longitudinally through the bottom of base 1 (not illustrated) to allow air to circulate from one end of box 46 to the other end through the channel beneath base 1, holes similar to holes 49 then being provided directly beneath resistors 3 and 4 through base 1 to the channel (not illustrated), thus aiding the convection of heat from resistors 3 and 4. Box 46 might also be cylindrical, elliptical, or other form, with or without a flattened portion for base 1, if desired.

Resistors 3 and 4 on base 1 in FIG. 1 could also be mounted directly in the previously mentioned transportation vehicles, switch 17 and connector 21 then being mounted separately from base 1 at a convenient location in such vehicles (similarly as on box 46) for operation of razor 33 as previously described, the input cable 18 of resistors 3 and 4 then being directly connected to the 12 volt battery source in the transportation vehicles.

Box 46 as illustrated in FIG. 7, or the resistor assembly as illustrated in FIGS. 1 and 2 might also be mounted at a convenient location in the transportation vehicles, input cable 18 of resistors 3 and 4 then being directly connected to the 12 volt battery source in the transportation vehicles. For example, the glove compartment of automobiles would be an excellent location for mounting box 46 of FIG. 7 or the resistor assembly of FIGS. 1 and 2. A bolt hole 51 in base 1, as illustrated in FIG. 1, located approximately midway between bolts 8 at each end of resistors 3 and 4 (two bolt holes) could be provided to bolt the resistor assembly of FIG. 1 or box 46 of FIG. 7 to the interior of the glove compartment, preferably on the left side, where it would be out of the way of articles in the glove compartment, matching holes being drilled in the side of the glove compartment for the two mounting bolts and nuts. Such a side mounting would provide excellent convection of heat from resistors 3 and 4, and would also provide for storage of razor 33 in the glove compartment where connector 31 could be conveniently plugged into connector 21 of the automotive adapter for recharging of the self-contained battery in razor 33. For such a side mounting of box 46, the mounting holes 51 in base 1 could be countersunk for a nut in the bottom of base 1 to firmly attach the mounting bolts to base 1, the bottom of the nut being flush with the bottom of base 1, thus allowing the secured mounting bolts to be conveniently inserted through matching holes in the side of the glove compartment for attachment with further nuts while the resistor assembly in box 46 is fully assembled. A compartment similar to the glove compartment of an automobile could be provided in other transportation vehicles for similar mounting of the present invention and storage or razor 33, where the self-contained battery of razor 33 could be conveniently recharged in a similar manner. Obviously such a storage compartment might also contain a plug-in connector for insertion of plug-in adapter 20, 30, or some similar plug-in adapter as indicated in FIGS. 3 and 4, thus permitting convenient removal or transfer of the razor adapter to some other vehicle, although the razor adapter would not then likely be permanently attached by the described mounting bolts. An electrical connector of the plug-in type could also be permanently attached in each of bolt holes 51 of base 1 by conventional fastening means such as a threaded or riveted end of such connectors (not illustrated), the two described plug-in connectors being respectively electrically connected to terminals 10 to replace cable 18, such that they could be plugged into matching receptacle connectors in the glove or storage compartment electrically connected to the 12 volt battery source of the transportation vehicle. The described electrical plug-in connectors (not illustrated) would thus serve as both the mounting and electrical connection means. Such plug-in connectors could be located in the glove compartment and back window deck of an automobile, also at convenient locations in a travel trailer, recreation vehicle, marine craft, or aircraft. Also one plug-in connector may be made larger in diameter than the other to maintain polarity in addition to establishing a pre-determined direction to push paddle 7 of switch 17 in FIG. 2 for starting and running the electric razor. The side of paddle 7 to push for starting could also be made red in color, and the side of paddle 7 to push for running could be made blue (or other appropriate colors), to facilitate starting and running directions.

When new self-contained batteries were placed in the Sunbeam electric razor, and the batteries were fully charged, the charging current with connector 31 of FIG. 3 plugged into connector 34 of household adapter 36 was approximately 0.04 amperes. Therefore the fully charged voltage of the self-contained batteries in the electric razor is evidently slightly below the voltage output of household adapter 36 to result in a continuous charging current of approximately 0.04 amperes even though the self-contained batteries are fully charged. In order to allow for full recharging of the self-contained batteries when connector 31 is plugged into connector 21, resistor 38 should therefore be of such value to result in approximately 0.04 amperes charging current. When the self-contained batteries of razor 33 become discharged, the recharging current with connector 31 plugged into connector 21 will still be approximately 0.04 amperes, for when the charging current attempts to increase, the resulting increased voltage drop in resistor 38 prevents an increase in charging current, so that the charging current remains practically constant at 0.04 amperes from complete discharge to full recharge of the self-contained batteries in razor 33. Thus 25 hours of recharging the self-contained batteries in razor 33 with the present invention would only create a 1 ampere hour drain on the 12 volt battery source of the transportation vehicle, which would be negligible in depleting the 12 volt battery source.

If switch 17 in FIGS. 2 and 3 should temporarily be placed in the normal running position while the switch on the electric razor is turned off, thus causing an increased charging current to flow into the self-contained battery of the electric razor, the charging current would be less than the normal operating current for the electric razor motor, because a small resistor is also provided in series between the contacts of the switch on the electric razor and the self-contained battery when the razor switch is off to prevent excessive charging of the self-contained battery after it has become fully charged. It would be desirable that this small resistor within the electric razor be of sufficient current handling capacity or wattage to withstand the charging current which would occur if switch 17 should be temporarily placed in the normal running position while the switch on the electric razor were in the off position. However, switch 17 should not be left continuously in the normal running position while the switch on the electric razor is in the off position, to prevent excessive charging of the self-contained battery in the electric razor. Switch 17 might be left in the normal running position for a short length of time while the switch on the electric razor is in the off position to provide a quick charge of the self-contained battery in the electric razor.

A small red indicator light could be conveniently installed on the dashboard or at any other appropriate location in the transportation vehicle, the red indicator light (not illustrated) being electrically connected in series with the battery leads to the razor adapter to warn or signal the operator when more than the normal charging current is flowing through the razor adapter. The red indicator light would of course be of appropriate resistance and wattage, electrically connected in series with the voltage lead from the battery source of the transportation vehicle to resistor 3 in FIG. 3, resistor 3 being of appropriate resistance to compensate for the resistance of the red indicator light. The red indicator light would not likely be used to completely replace resistor 3, since a 10 watt indicator light would seem to be excessive, although the red indicator light could replace resistor 3, a wire conductor then merely replacing resistor 3 in FIG. 3. In the event the red indicator light were used to completely replace resistor 3, resistor 4 could be divided into two sections (not illustrated), one section being mounted in the illustrated position of resistor 4, and the other section being mounted in the illustrated position of resistor 3, the two sections being electrically connected in series to constitute resistor 4, resistor 4 being electrically connected to terminals 25 and 27 of switch 17 as illustrated in FIG. 3. An extra terminal (not illustrated) would then be provided on base 1 for connection of terminal 24 of switch 17 to the wire of cable 18 which was removed from resistor 3, the red indicator light as previously described taking the place of resistor 3. Thus the razor adapter of FIG. 1 would be reduced to one-half length in size, although reduction in size would not be an appreciable advantage, for the adapter is quite compact as illustrated, being only about 4 inches in total length, which provides a good stable base for operation of switch 17. Therefore if a red indicator light were used as described, it would likely be preferred to maintain resistors 3 and 4 as illustrated in FIG. 3, with possibly a small equal reduction in the length of both resistors 3 and 4 to compensate for the added resistance of the indicator light.

Although the present invention was not actually tested with other brands of cordless electric razors having self-contained batteries, it is assumed that they would operate similarly to the Remington Rand and Sunbeam models which were tested. If a slightly different value of resistors 3 and 4 should be required for other brands of electric razors, resistors 3 and 4 could be specifically designed for each particular model razor to assure proper operation. Small strips of copper, brass, or aluminum approximately one-eighth inch wide may also be bent into U-shaped clips 52, as illustrated in FIG. 6, to be inserted into the coils of resistors 3 and 4 to clip an appropriate number of turns of resistors 3 and 4 together. The end of U-clips 52 may be bent together with a long nose plier after being inserted between the coil of resistors 3 and 4 to securely fasten the clips in place. Resistors 3 and 4 as illustrated would then be the maximum resistance that would be required for various brands of electric razors, U-clips 52 being provided as required to appropriately adjust resistances 3 and 4 to particular brands of razors. The dimension X of U-clip 52 may be made appropriate to that required for each particular brand of electric razor. The red indicator light in series with the battery lead to the razor adapter as previously described might also be made an optional feature, with appropriate U clips 52 being provided to properly adjust resistor 3 to compensate for the resistance of the indicator light if used.

Although it is believed that the present invention as previously set forth in the detailed description in conjunction with the illustrative drawings would be preferred, some further modifications or additions which might be envisioned are as follows.

It has been previously pointed out that switch 17 could be a single-pole, three position switch to respectively connect a first, second, and third resistance in series between cable 18 and cable 19, the first resistance serving as starting resistance, the second resistance serving as running resistance, and the third resistance serving as charging resistance. Thus for example the rotor of such a single pole switch (not illustrated) would be electrically connected to one wire of cable 19, and the common terminal of the three resistances electrically connected to one wire of cable 18, the unused wire of cable 18 being electrically connected to the unused wire of cable 19. The first, second, and third stator taps of switch 17 (not illustrated) would then be respectively connected to the described first, second, and third resistance means, the rotor or adjustable element of switch 17 making electrical contact with the stator taps in a conventional manner. The resistance means of course could have a first, second, and third tap, resistors 3, 4, and 38 in FIG. 3 then being electrically connected in series to constitute such resistance means. Resistance 3 would then be the starting resistance, resistor 3 in series with resistor 4 would be the running resistance, and resistor 3 in series with resistor 4 in series with resistor 38 would be the charging resistance, similarly as described.

In addition, the wire electrically joining the second stator tap of the described single-pole switch 17 (not illustrated) to the second resistance tap (resistor 3 in series with resistor 4) could have a single-pole, single-throw switch 17a (not illustrated) inserted in series with the lead. The described switch 17a (not illustrated) would be within the electric razor, operated by the razor switch so as to be on when the razor switch is turned to operate the razor from line cord 19, switch 17a (not illustrated) being off when the razor switch is turned to off or charging position. The terminals of the described switch 17a (not illustrated) would be electrically connected by an additional two wire cable 19a (not illustrated) to electrically connect the second stator tap of switch 17 (not illustrated) to the second resistance tap (not illustrated) as described. Thus when the razor switch is in off or charging position, if switch 17 should be left in the running position, switch 17a would prevent an excessive charging current through cable 19. Cables 19 and 32 in FIG. 3 would then be a four wire cable, four pin connectors being provided for electrical connection of the four wire cables, similarly as described for the two wire cables. (Since the starting position of switch 17 is to be used for only an instant, it is not likely that switch 17 would ever be left in the starting position. Switch 17 may also have a spring return from the starting position to off position to prevent such possibility, as previously described.) However, it is believed the provision of a red indicator light in series with the input to the razor adapter as previously described would be simpler and preferred, if any such safety precautions were desired. The red indicator light also provides for temporary rapid charging of the self-contained battery in the electric razor when switch 17 is in the running position, and the razor adapter as illustrated in FIGS. 1, 2, and 3 can be used with existing electric razors with a self-contained battery without any or only slight modification, as previously described.

Since many changes could be made in the aforesaid construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An adapter for an electric razor suitable for transportation vehicles wherein said electric razor has a primary self-contained battery source for operation of said electric razor, said adapter comprising: appropriate electrical resistance means, means to electrically connect the input of said electrical resistance means to a secondary battery source such as in transportation vehicles, said secondary battery source being of higher voltage than said primary battery source, means to electrically connect the output of said electrical resistance means to the input of said electric razor, switching means to electrically connect a first appropriate resistance of said resistance means in series between said secondary battery source and said electric razor to start said electric razor, switching means to further electrically connect a second appropriate resistance of said resistance means in series between said secondary battery source and said electric razor for normal running of said electric razor, switching means to further electrically connect a third appropriate resistance of said resistance means in series between said secondary battery source and said primary battery source to properly recharge said primary battery source from said secondary battery source.

2. An adapter for an electric razor as set forth in claim 1 wherein said switching means has three position contacts, a first position of said switching means providing for starting of said electric razor from said secondary battery source, a second position of said switching means providing for normal running of said electric razor from said secondary battery source, and a third position of said switching means providing for recharging of said primary battery source from said secondary battery source.

3. An adapter for an electric razor as set forth in claim 2 wherein said switching means has double-pole three position contacts, contacts of a first pole of said switching means being electrically connected to shunt a primary portion of said electrical resistance means when said switching means is placed in said first position, said contacts of said first pole of said switching means disconnecting said shunt of said primary portion of said electrical resistance means when said switching means is placed in either said second or third positions, contacts of a second pole of said switching means being electrically connected to shunt a secondary portion of said resistance means when said switching means is placed in either said first or second positions, said contacts of said second pole of said switching means disconnecting said shunt of said secondary portion of said resistance means when said switching means is placed in said third position.

4. An adapter for an electric razor as set forth in claim 3 wherein said switching means comprises a double-pole, double-throw, center position off switch.

5. The apparatus of claim 1 including means to place said resistance means in said transportation vehicle, means to place said switching means in said transportation vehicle, said means to electrically connect the output of said electrical resistance means to the input of said electric razor including connector means, means to place said connector means in said transportation vehicle.

6. The apparatus of claim 2 including means to place said resistance means in said transportation vehicle, means to place said switching means in said transportation vehicle, said means to electrically connect the output of said electrical resistance means to the input of said electric razor including connector means, means to place said connector means in said transportation vehicle.

7. The apparatus of claim 3 including means to place said resistance means in said transportation vehicle, means to place said switching means in said transportation vehicle, said means to electrically connect the output of said electrical resistance means to the input of said electric razor including connector means, means to place said connector means in said transportation vehicle.

8. An adapter for an electric razor as set forth in claim 1 wherein said means to electrically connect the output of said electrical resistance means to the input of said electric razor includes, first connector means electrically connected to an input element of said electric razor, second connector means electrically connected to an output element of said electrical resistance means, said second connector means conforming to said first connector means such that said first and second connector means may be interjoined to make proper electrical connection between said electric razor and said electrical resistance means.

9. The apparatus of claim 8 including, means to appropriately place said electrical resistance means in said transportation vehicle, means to appropriately place said switching means in said transportation vehicle, and means to appropriately place said second connector means in said transportation vehicle.

10. The apparatus of claim 8 including, further adapter means, said further adapter means comprizing means for connection to sources of electrical energy maintained at different voltages, means in said further adapter means for reduction of the voltage of the source electrical energy to a voltage output suitable for operating said electric razor, third connector means electrically connected to the voltage output of said further adapter means, said third connector means conforming to said first connector means such that said first and third connector means may be interjoined to make proper electrical connection between said electric razor and said further adapter means.

11. An adapter for an electric razor suitable for transportation vehicles wherein said electric razor has a primary self-contained battery source for operation of said electric razor, said adapter comprizing: appropriate electrical resistance means, base means, first mounting means to attach said electrical resistance means to said base means, means to electrically connect the input of said electrical resistance means to a secondary battery source such as in said transportation vehicles, said secondary battery source being of higher voltage than said primary battery source, means to electrically connect the output of said electrical resistance means to the input of said electric razor, switching means, second mounting means to attach said switching means to said base means, said switching means including means to electrically connect a first appropriate resistance of said resistance means in series between said secondary battery source and said electric razor to start said electric razor, said switching means including means to further electrically connect a second appropriate resistance of said resistance means in series between said secondary battery source and said electric razor for normal running of said electric razor, said switching means including means to further electrically connect a third appropriate resistance of said resistance means in series between said secondary battery source and said primary battery source to properly recharge said primary battery source from said secondary battery source.

12. An adapter for an electric razor as set forth in claim 11 wherein said switching means has three position contacts, a first position of said switching means providing for starting of said electric razor from said secondary battery source, a second position of said switching means providing for normal running of said electric razor from said secondary battery source, and a third position of said switching means providing for recharging of said primary battery source from said secondary battery source.

13. An adapter for an electric razor as set forth in claim 12 wherein said switching means has double-pole three position contacts, contacts of a first pole of said switching means being electrically connected to shunt a primary portion of said electrical resistance means when said switching means is placed in said first position, said contacts of said first pole of said switching means disconnecting said shunt of said primary portion of said electrical resistance means when said switching means is placed in either said second or third positions, contacts of a second pole of said switching means being electrically connected to shunt a secondary portion of said resistance means when said switching means is placed in either said first or second positions, said contacts of said second pole of said switching means disconnecting said shunt of said secondary portion of said resistance means when said switching means is placed in said third position.

14. An adapter for an electric razor as set forth in claim 13 wherein said switching means comprizes a double-pole, double-throw, center position off switch.

15. The apparatus of claim 11 wherein said means to electrically connect the output of said electrical resistance means to the input of said electric razor includes connector means, means to position said adapter in said transportation vehicle.

16. The apparatus of claim 12 wherein said means to electrically connect the output of said electrical resistance means to the input of said electric razor includes connector means, means to position said adapter in said transportation vehicle.

17. The apparatus of claim 13 wherein said means to electrically connect the output of said electrical resistance means to the input of said electric razor includes connector means, means to position said adapter in said transportation vehicle.

18. An adapter for an electric razor as set forth in claim 11 wherein said means to electrically connect the output of said electrical resistance means to the input of said electric razor includes, first connector means electrically connected to an input element of said electric razor, second connector means electrically connected to an output element of said electrical resistance means, said second connector means conforming to said first connector means such that said first and second connector means may be interjoined to make proper electrical connection between said electric razor and said electrical resistance means.

19. An adapter for an electric razor as set forth in claim 18 including, means to attach said second connector means to said adapter.

20. The apparatus of claim 18 including, means to position said adapter in said transportation vehicle.

21. The apparatus of claim 18 including, further adapter means, said further adapter means comprizing means for connection to sources of electrical energy maintained at different voltages, means in said further adapter means for reduction of the voltage of the source electrical energy to a voltage output suitable for operating said electric razor, third connector means electrically connected to the voltage output of said further adapter means, said third connector means conforming to said first connector means such that said first and third connector means may be interjoined to make proper electrical connection between said electric razor and said further adapter means.

22. An adapter for an electric razor as set forth in claim 11 wherein said means to electrically connect the input of said electrical resistance means to a secondary battery source such as in said transportation vehicles includes, first connector means electrically connected to an input element of said electrical resistance means, second connector means electrically connected to said secondary battery source, said second connector means conforming to said first connector means such that said first and second connector means may be interjoined to make proper electrical connection between said secondary battery source and the input of said electrical resistance means.

23. The apparatus of claim 22 including, means to attach said second connector means to said transportation vehicle.

24. The apparatus of claim 22 including, means to attach said first connector means to said adapter.

25. The apparatus of claim 11 including, enclosing means to encompass said resistance means.

26. The apparatus of claim 25 wherein said enclosing means has appropriate openings in its surface to permit convection of heat from said resistance means.

27. The apparatus of claim 25 wherein said enclosing means is in the form of a truncated pyramid.

28. The apparatus of claim 27 wherein said truncated pyramidal enclosing means has two sides partially enclosing said resistance means, the two ends of said truncated pyramidal enclosing means being open to permit convection of heat from said resistance means.

29. The apparatus of claim 1 including, safeguard means to prevent excessive recharging of said primary battery source from said secondary battery source by said switching means.

30. The apparatus of claim 11 including, safeguard means to prevent excessive recharging of said primary battery source from said secondary battery source by said switching means.

* * * * *